(12) United States Patent
Cebasek et al.

(10) Patent No.: US 11,395,570 B2
(45) Date of Patent: Jul. 26, 2022

(54) SEPARATOR FOR VACUUM CLEANER

(71) Applicant: HYLA, PROIZVODNJA, RAZVOJ IN TRGOVINA D.O.O., Ljubljana-Crnuce (SI)

(72) Inventors: Metod Cebasek, Smlednik (SI); Slavko Zaksek, Domzale (SI); Janez Pogacar, Rovte (SI)

(73) Assignee: HYLA, PROIZVODNJA, RAZVOJ IN TRGOVINA D.O.O., Ljubljana-Crnuce (SI)

( * ) Notice: Subject to any disclaimer, the term of this patent is extended or adjusted under 35 U.S.C. 154(b) by 0 days.

(21) Appl. No.: 17/601,398

(22) PCT Filed: Mar. 25, 2020

(86) PCT No.: PCT/SI2020/050009
§ 371 (c)(1),
(2) Date: Oct. 4, 2021

(87) PCT Pub. No.: WO2021/177901
PCT Pub. Date: Sep. 10, 2021

(65) Prior Publication Data
US 2022/0095868 A1   Mar. 31, 2022

(30) Foreign Application Priority Data
Mar. 5, 2020   (SI) ................. P-202000044

(51) Int. Cl.
*B01D 45/00*  (2006.01)
*A47L 9/18*   (2006.01)
(Continued)

(52) U.S. Cl.
CPC ............... *A47L 9/188* (2013.01); *A47L 9/181* (2013.01); *B01D 45/14* (2013.01); *B01D 47/02* (2013.01)

(58) Field of Classification Search
CPC .......... B01D 45/14; A47L 9/188; A47L 9/181
(Continued)

(56) References Cited

U.S. PATENT DOCUMENTS

| | | | |
|---|---|---|---|
| 2004/0020004 A1* | 2/2004 | Pogacar | B01D 45/14 15/353 |
| 2004/0068826 A1 | 4/2004 | Howie et al. | |

FOREIGN PATENT DOCUMENTS

| | | |
|---|---|---|
| EP | 1219223 A2 | 7/2002 |
| EP | 1261269 A1 | 12/2002 |
| IT | TO20110209 A1 | 6/2011 |

* cited by examiner

*Primary Examiner* — T. Bennett McKenzie
(74) *Attorney, Agent, or Firm* — The Watson IP Group, PLC; Jovan N. Jovanovic

(57) ABSTRACT

The present invention relates to a separator for vacuum cleaners operating on the basis of a liquid bath, the liquid bath serving as pre-separation and as a dumping area for the aspirated particles. It consists of segments (7), each of the segments (7) being formed as a radially flat ring (13) that is centrally secured to a hub (11) via radial supports (12) and having blades (8) extending equidistantly and substantially perpendicularly to the surface of the ring (13). The blades (8) are positioned on each individual segment (7) in a way that a gap (9) is formed between each two adjacent blades (8) of each segment (7). When individual segments (7) are stacked one over another, the blades (8) of one segment (7) extend into the gaps (9) between the blades (8) of the next segment (7), such that a newly formed gap (91) is formed between the two adjacent blades (8) of the assembled separator (1). In a preferred embodiment, the separator (1) consists of two end segments (71, 72) and at least one intermediate segment (73), the first end segment (71) preferably having the radially flat ring (13) provided with an integrated sealing ring (Continued)

Figure 1:
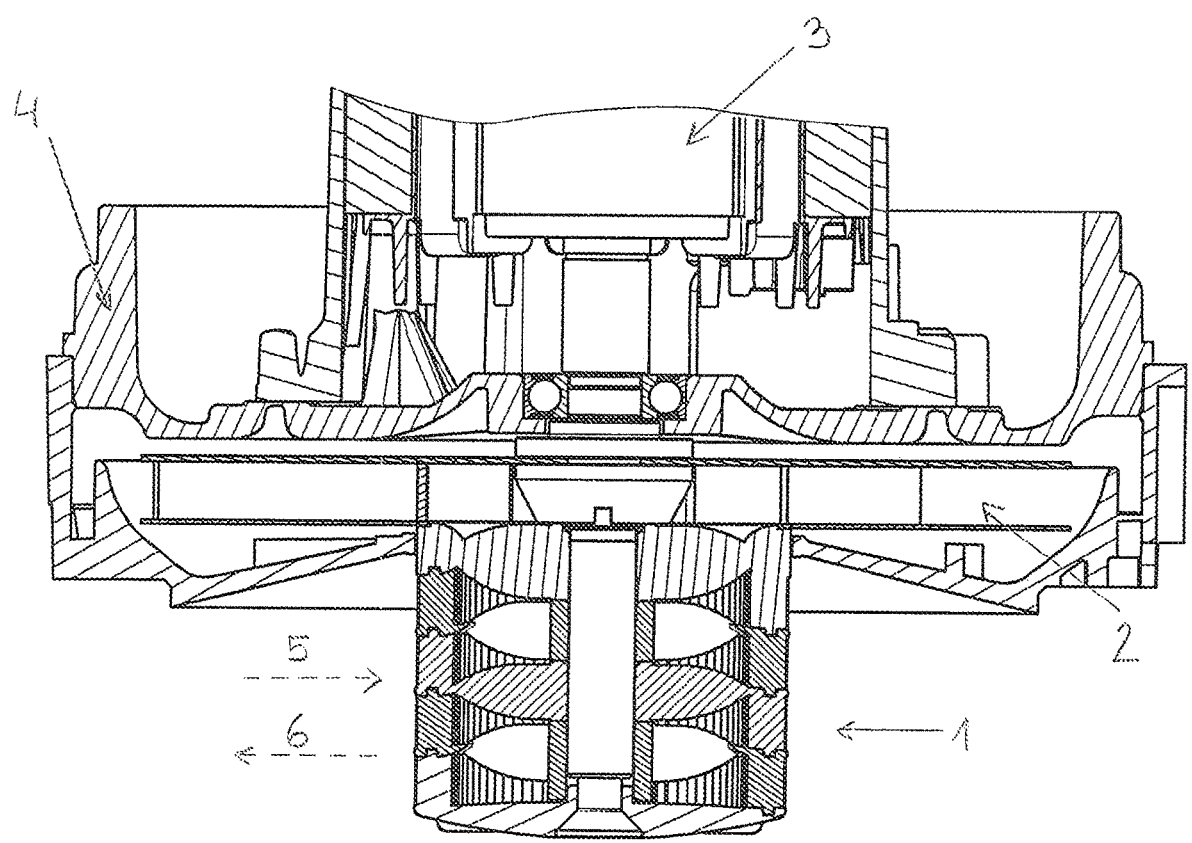

(30), and the second end segment (72) having the radially flat ring (13) provided with an integrated bottom (20).

13 Claims, 4 Drawing Sheets

(51) Int. Cl.
*B01D 45/14* (2006.01)
*B01D 47/02* (2006.01)

(58) Field of Classification Search
USPC ................. 55/400–409; 96/234–242; 15/353
See application file for complete search history.

SEPARATOR FOR VACUUM CLEANER

The present invention relates to a separator for vacuum cleaners operating on the basis of a liquid bath, the liquid bath serving as pre-separation and as a dumping area for the aspirated particles. The vacuum cleaners are so-called "dust vacuum cleaners" and are intended for cleaning.

Vacuum cleaners of various designs are known for use on residential and business premises. A common feature shared by all vacuum cleaners is that they create an air negative pressure and thus an airflow that aspirates unwanted particles and, in some embodiments, liquids into the vacuum cleaner. Within the vacuum cleaner, it is then necessary to separate the aspirated air from the aspirated particles and possibly the aspirated liquids. The air, after having been separated from the particles and possible liquids, is returned to the room, while the particles and any possible liquid must remain in the vacuum cleaner. The separation of particles from the air can be done with a mechanical filter, while the separation of particles and possibly aspirated liquids from the air can be done with a liquid bath (filter) and a special separator. An advantage of separating and disposing of particles and possibly aspirated liquids from the air by means of a liquid bath is that the liquid, which is usually water, is always available, unlike a mechanical filter, so in addition to solids also liquids can be aspirated, and thus e.g. also cleaning agents and that this type of vacuum cleaner, when used, slightly moistens the air in the room where it is used. A common problem of all liquid bath vacuum cleaners is that in addition to the particles also the fluid that joins the air stream must be removed from the air. Most liquid bath vacuum cleaners separate air from particles and the associated liquid by centrifugation, since air has a significantly lower specific mass than particles or liquid.

Liquid bath vacuum cleaners are disclosed for instance in patents U.S. Pat. No. 4,640,697 or DE 36 32 992, U.S. Pat. Nos. 5,030,257 and 5,125,129. The main disadvantage of solutions to air and particle separation according to these patents is that the structure of the separators is technically demanding and not sufficiently efficient.

According to patent EP 0 496 837 B1, the separation of the air from the particles is carried out in three stages. As the air flows through the deposition liquid, large particles in this liquid get wetted and remain in it. Small particles flow with the air flow towards the separator and bind on its surface to fine droplets of liquid and, due to the high speed of rotation of the separator (from 20,000 to 25,000 rpm), are forced back to the liquid container. The smallest particles, along with micro droplets of liquid, are trapped inside the separator where, due to the huge centrifugal acceleration of up to 12,000 g, they stick to the inner wall of the separator. This third and final phase of separation of air from particles and liquid means that particles are accumulated inside the separator, said particles reducing the separator slots, thereby reducing the efficiency of both the separator and the entire vacuum cleaner and imbalance the separator, thereby causing vibrations. Due to the above-mentioned accumulation of particles inside the separator, the separator needs to be periodically cleaned, which is an inconvenience for the user and, above all, a potential danger since the separator must be dismounted. While performing this operation, the vacuum cleaner motor should not be driven as this would cause damage to the user due to rotation. Such a solution to separating air from particles and liquids, especially from the point of view of user's safety but also due to it being impractical, is a problem that needs to be solved.

Separation according to U.S. Pat. No. 5,902,386 is solved in a similar way as in EP 0 496 837 B1. An improvement is reflected in the separator's slot depth to width ratio and in the labyrinth added above the separator, which produces a counter airflow for preventing droplets and dust particles from entering the intake turbine wheel.

The main and common disadvantage of the solutions to the separator according to EP 0 496 837 B1 and U.S. Pat. No. 5,902,386 is the separator configured as a conical basket with vertical slots formed in a side wall of the separator. A side wall is formed as an array of ribs with slots formed between the ribs. Due to the high speed of rotation of the separator and, consequently, high centrifugal forces, the ribs and as a result the side wall get deformed, i.e. bulge outwards. The separator is deformed, the slots become larger and the separator becomes inefficient. The separator is no longer balanced and vibrations are generated. In this structure, reinforcing the ribs of the side wall is the only way to avoid the deformation of the separator. This makes the side wall firmer, the slots smaller, thereby reducing the efficiency of the separator. In addition, wider ribs mean an increased area, on which dust particles and other impurities accumulate. The separator of this type is therefore less efficient due to its structure, due to the accumulation of dust particles and other impurities it becomes even less efficient and needs to be periodically cleaned as previously described.

An interesting solution is disclosed in U.S. Pat. No. 5,908,493, which is based on a completely different three-stage separation.

Also known is a solution from EP 1 261 269 B1, wherein the separator consists of segments and a segment of the separator is made as a wheel having a periphery on radial supports, the periphery being provided with uniformly distributed blades.

Blades designed according to patent EP 142 60 93 are also known. The blades are designed in a way to produce turbulence spaces behind the front of the blades.

The object and goal of the invention is a structure of an improved vacuum cleaner separator that will increase the efficiency of extraction of particles and associated liquid from the air stream and will prevent dust or other impurities from accumulating on the separator or the blades, thereby avoiding cleaning of the separator and preventing liquid droplets, dust particles and other impurities from entering the turbine wheel space.

Experience has shown that efficient separation requires air slots between the blades to be as small as possible, wherein the total area of the slots should be as large as possible. The shape of the blades is also important. The blades basically have the shape of an aircraft wing, with the front side of the blades being sharply truncated and the thickness of the blades continuously decreases towards a tail, i. e. the end of the blades in the interior of the separator, so that the tails of the blades are formed as a sharp edge. A sharply truncated front side increases the efficiency of expulsion of solid particles, while the sharp edge of the tails of the blades reduces the accumulation of dirt on the separator blades.

The task of the invention is solved by the independent patent claim.

Figure 2:
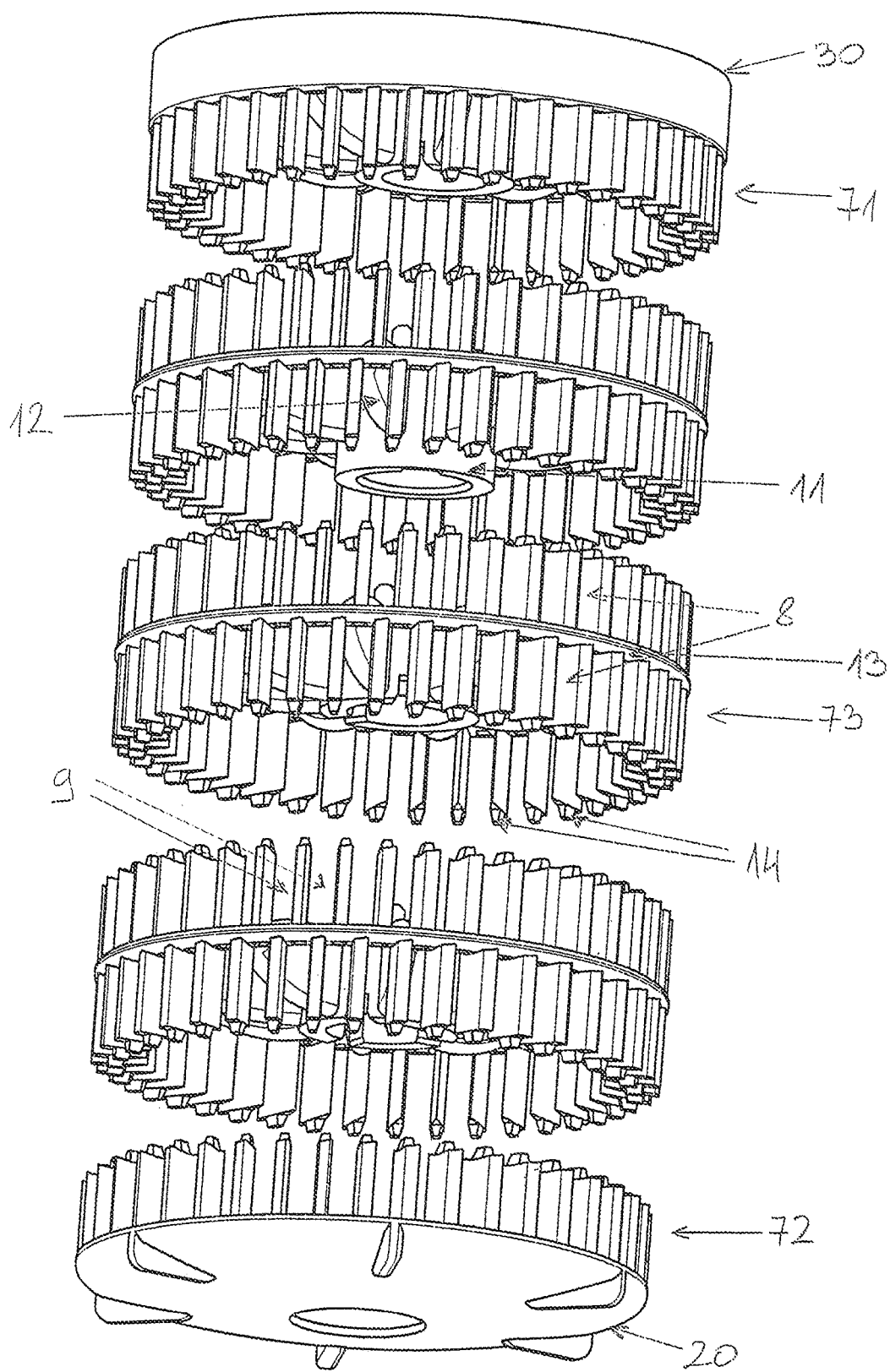
Figure 3:
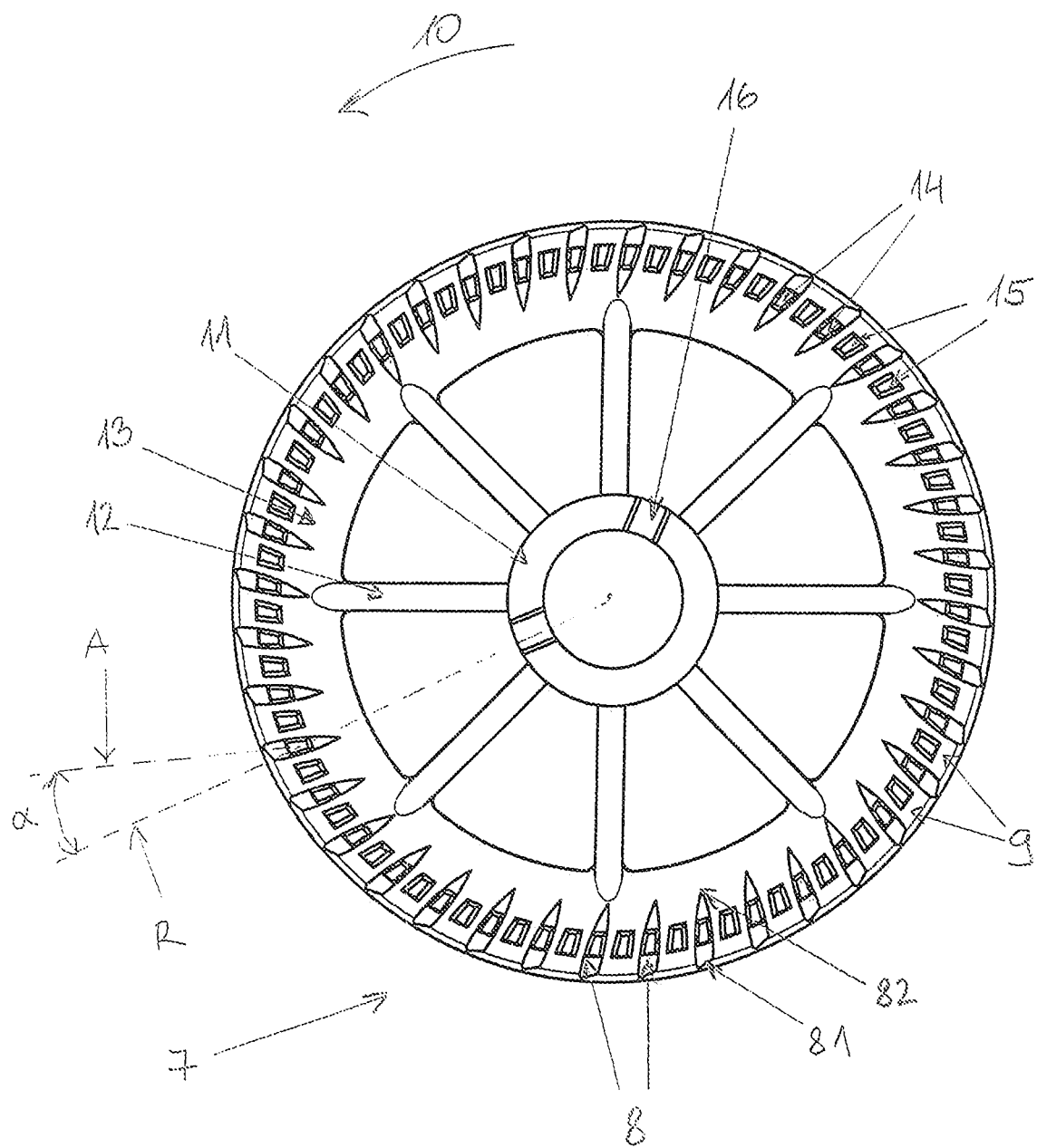
Figure 4:
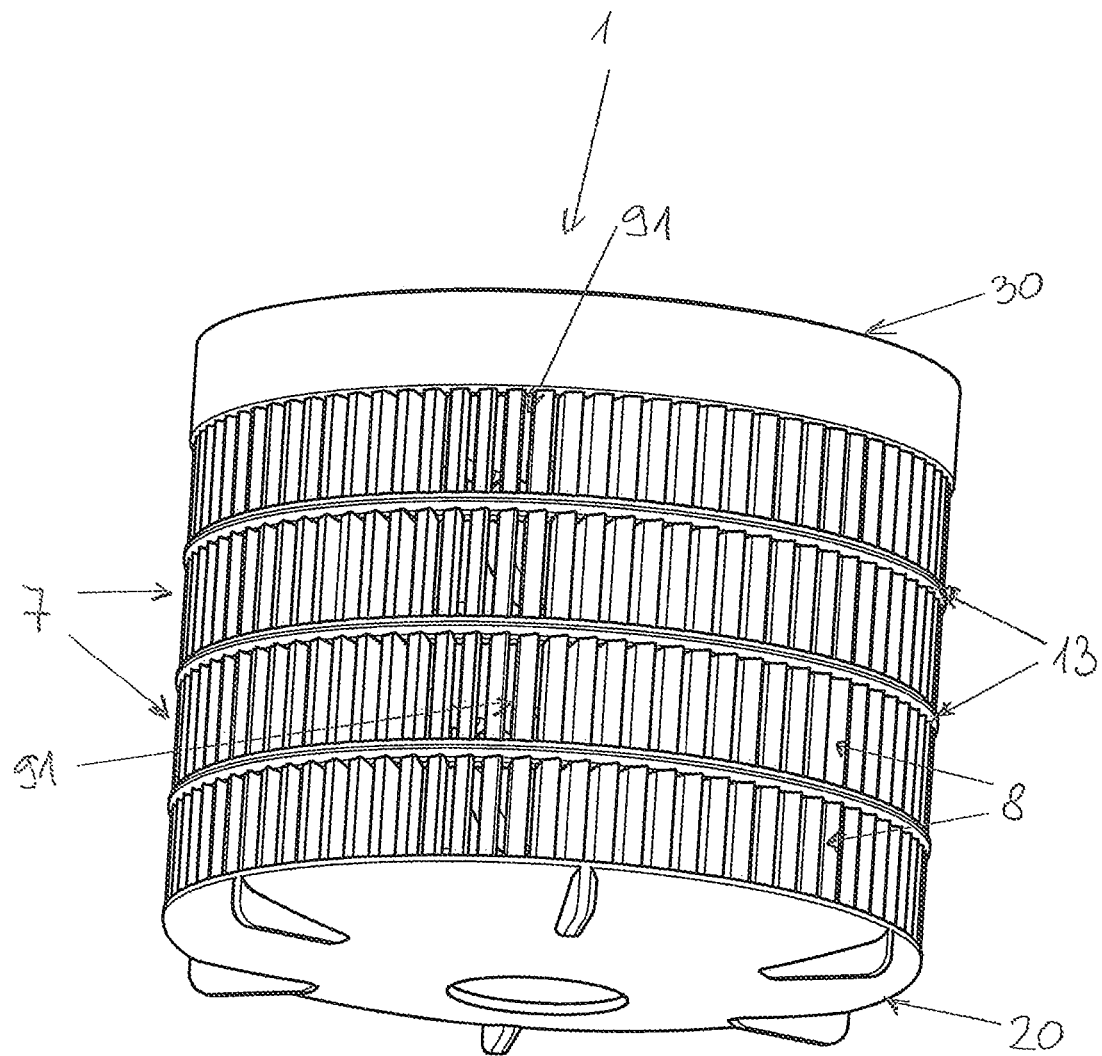

The invention will be described in more detail by way of an embodiment and the accompanying drawings representing in:

FIG. 1 Embodiment of a separator and turbine assembly,

FIG. 2 Disassembled separator in perspective view ("exploded view"),

FIG. 3 Segment of the separator, top view,

FIG. 4 Assembled separator.

An assembly consisting of a separator 1 and a turbine wheel 2 with a motor 3 within a housing 4 is the basis of operation of a liquid-bath based vacuum cleaner. In principle, the vacuum cleaner operates in a way that the motor 3 on its shaft drives the turbine wheel 2 and the separator 1. The assembly and the operation are illustrated in FIG. 1. The turbine wheel 2 generates negative pressure, as a result, a flow including a mixture of air, water droplets and other impurities is created which is directed towards the separator 1 in the direction of arrow 5. As the separator 1 rotates at high speed, droplets and other impurities having a high specific weight, due to centrifugal force, cannot enter the separator 1 or can do so only exceptionally. The air having a low specific weight, however, enters the separator 1 due to the pressure generated by the turbine wheel 2, the air is drawn in by the turbine wheel 2 and blown into the room. Droplets and other impurities that accidentally penetrate the separator 1 are rotated in the separator 1 by means of radial supports 12 and ejected from the separator 1 by centrifugal force as indicated by arrow 6.

The structure and the operation of the separator will be explained by way of drawings.

The separator 1 of the invention illustrated in FIGS. 2 to 4 preferably has a cylindrical shape and consist of segments 7, each of the segments 7 being formed as a radially flat ring 13 that is centrally secured to a hub 11 via radial supports 12 and having separator blades 8 equidistantly formed substantially perpendicularly to the surface of the ring 13, such that a gap 9 is formed between each two adjacent blades 8 of each segment 7, and the blades 8 are positioned on each individual segment 7 in a way that, when individual segments 7 are stacked one over another, the blades 8 of one segment 7 extend into the gaps 9 between the blades 8 of the next segment 7, such that a newly formed gap 91 is formed between the two adjacent blades 8 of the assembled separator 1. Each of the segments 7 has an axially formed hub 11 with an opening for attaching the separator 1 to the shaft of the motor 3.

On the radially flat ring 13, the separator blades 8 extend from the outer periphery of the ring 13 inwards and are positioned in a way that an angle α is present in the opposite direction of rotation between the radial direction R and the direction A of a blade, with the angle α being in the range 0 to 40 angular degrees. The direction of rotation is indicated by arrow 10.

The minimum width of each gap 9 is approximately 1.2 to 3.5 of the maximum thickness of the blade 8. The widths of the gaps 9 are preferably identical.

The blades 8 have their front side 81, i. e. outer side, sharply truncated. The blades 8 have basically a profile of an aircraft wing, however, experiments have shown that particles get better deflected if the front side 81 of the blade 8 is cut at an angle of about 15 to 45 angular degrees with respect to the tangent of the circumference. So, the front side of a blade 8 physically deflects, hits particles and water from the separator 1.

The thickness of the blades 8 continuously decreases towards a tail 82 i. e. the end of the blades 8 in the interior of the separator, so that the tails 82 of the blades 8 are formed as a sharp edge which reduce the accumulation of dirt on the blades 8 of the separator 1.

The blades 8 are provided at their upper edge with projections 14, the radially flat rings 13 are provided in the gaps 9 with recesses 15 so that, when the segments 7 are assembled, the projections 14 on the blades 8 engage the recesses 15 on the radially flat rings 13, the blades 8 being thus still additionally fixed.

When two adjacent segments 7 are assembled, the blades 8 of a first segment 7 engage the gaps 9 between the blades 8 of another segment 7, preferably the centre of the gaps 9, so when two adjacent segments 7 are assembled, a newly formed gap 91 is formed between two adjacent blades 8 of the assembled separator 1. The minimum width of the newly formed gap 91 is between 0.1 to 1.25 of the maximum thickness of the blade 8. The widths of the newly formed gaps 91 are preferably identical.

The engagement of the blades 8 of one segment 7, when assembling the segments 7, with the gaps 9 between the blades 8 of another segment 7, is ensured by positioning connectors 16 formed on the hub 11 of a respective segment 7.

The separator preferably consists of a first end segment 71, a second end segment 72, and at least one intermediate segment 73.

The first end segment 71 is the segment abutting the turbine wheel 2, the second end segment 72 is the segment the most distant from the turbine wheel 2.

The intermediate segment 73 of the separator 1 is provided with blades 8 on both sides of the radially flat ring 13. In one embodiment shown in FIGS. 2 and 3, the blades 8 on either side of the radially flat ring 13 are arranged so as to be offset on one side of the radially flat ring 13 towards the blades 8 on the other side of the radially flat ring 13. The blades 8 are preferably offset by half the width of the gap 9.

The blades 8 on either side of the radially flat ring 13 can also be arranged in a different way, for instance the blades 8 on both sides of the radially flat ring 13 can be arranged without an offset, they are aligned one above the other.

In the longitudinal cross-section of FIG. 1, the radial supports 12 are shaped so as to cover 50 to 100% of the total height of the hub 11 along the hub 11, while their height decreases towards the ring 13. The radial supports 12 act as an additional turbine that ejects particles and liquid from the separator that could possibly penetrate the separator. The height of the hub 11 is approximately identical to the height of the blades 8.

The first end segment 71 and the second end segment 72 are provided with blades 8 only on one side of the radially flat ring 13. The first end segment 71 is provided with blades 8 on the side of the radially flat ring 13 facing away from the turbine wheel 2. The second end segment 72 is provided with blades 8 on the side of the radially flat ring 13 facing the turbine wheel 2.

According to one embodiment, the first end segment 71 and the second end segment 72 can be formed as stand-alone elements, a bottom 20 and a sealing ring 30 also being formed as stand-alone elements. In this case, both end segments 71, 72 are formed as a radially flat ring 13 that is centrically attached to the hub 11 through radial supports 12. In this case, the radial supports 12 and the hub 11 are adequately adapted not to obstruct the fitting of the sealing ring 30 and the bottom 20 on the end segments 71, 72.

The first end segment 71 preferably has the radially flat ring 13 provided with an integrated sealing ring 30, and the second end segment 72 has the radially flat ring 13 provided with an integrated bottom 20. In this way, fewer pieces are needed to produce the separator, as the sealing ring 30 and the bottom 20 need not be separately manufactured, and the relationship between the structural strength of the separator and the material consumption is improved.

In the embodiment shown in the figures, the separator according to the invention consists of five segments, namely, a second end segment 72 with an integrated bottom 20, three intermediate segments 73, and a first end segment 71 with an integrated sealing ring 30, all segments being assembled one on another and mutually positioned with positioning connectors 16 provided on the hub 11 of each segment 73, 71, 72. In this embodiment, the positioning connectors 16 are made as matching projections on the upper portion of the hub 11 and recesses on the lower portion of the hub 11 of each segment 73, 71, 72 of the separator 1.

So, the separator 1 consists of a second end segment 72 with an integrated bottom 20, to which a first intermediate segment 73 is arranged in a corresponding position determined by the positioning connectors 16, such that the blades 8 of the first intermediate segment 73 that are provided at the bottom side of the radially flat ring 13, are positioned in the centre of the gaps 9 between the blades 8 which are provided on the radially flat ring 13 of the second end segment 72. The second end segment 73 is placed onto the first intermediate segment 73 and positioned by positioning connectors 16, such that the blades 8 of the second intermediate segment 73 that are provided at the bottom side of the radially flat ring 13, are positioned in the centre of the gaps 9 between the blades 8 which are provided on the upper side of the radially flat ring 13 of the first intermediate segment 73. The number of intermediate segments 73 corresponds to the capacity of the separator 1. The separator 1 terminates at the upper portion with a first end segment 71 with an integrated sealing ring 30, such that the blades 8 of the first end segment 71 are positioned in the centre of the gaps 9 between the blades 8 which are provided on the upper side of the radially flat ring 13 of the last intermediate segment 73. When the separator 1 is assembled, a newly formed gap 91 is formed between two adjacent blades 8 of the assembled separator 1.

When the separator 1 rotates, the air enters the interior due to the negative pressure generated by the turbine wheel 2. Droplets, dust and other impurities are largely deflected by the blades 8 due to their large specific weight. Droplets, dust, and other impurities incidentally entering the separator 1 are further rotated by the radial supports 12 and ejected from the separator 1 between the blades 8. The blades 8 have basically the profile of an aircraft wing, but their outer edge is not aerodynamic, it is cut at the outer ends to a sharp edge at an angle, so as to deflect particles of impurities and liquids away from the separator, thereby preventing the impurities from settling. The construction according to the invention is mechanically solid, since the radially flat ring 13 is suspended at several points on the radial supports 12 and the blades 8 on the radially flat ring 13. The separator 1 is thus not subject to deformation due to centrifugal force. In this embodiment, the separator consists of segments 73, 71, 72, this is why the moulding tools can be simple. By varying the number of segments, any heights are possible, thereby increasing the capacity of the separator 1. It goes without saying that the invention also includes a separator made as one integral piece over the entire height.

The separator of the invention provides minimal gaps between the blades 8 and a large total surface of the gaps between the blades 8.

The invention has been described by way of one embodiment, however, it goes without saying that all structures, in which the separator has blades, wherein the blades of one segment engage between the blades of another segments, fall within the scope of the invention.

The invention claimed is:
1. A separator for vacuum cleaners operating on a basis of a liquid bath, the liquid bath serving as pre-separation and as a dumping area for aspirated particles and air flow being generated by a turbine wheel in a housing separation being achieved by the separator via centrifugal force, the separator comprising at least two segments, each of the two segments being formed as a radially flat ring that is centrally secured to a hub via radial supports and having blades equidistantly formed and substantially perpendicularly to a surface of the radially flat ring, said blades extending from an outer circumference of the radially flat ring towards an interior, and the blades being positioned in a way that an angle ($\alpha$) is present in an opposite direction of rotation between a radial direction (R) and a direction (A) of the blades, said angle ($\alpha$) being in a range 0 to 40 angular degrees, and the hub having an opening for attaching the separator to a shaft of a motor, wherein the blades are positioned on each individual of the two segments in a way that a gap is formed between each two adjacent blades of each of the two segments, wherein, when individual of the two segments are stacked one over another, the blades of one of the two segments extend into the gaps between the blades of a next of the two segments, such that a newly formed gap is formed between the two adjacent blades of the separator when assembled.

2. The separator according to claim 1, wherein a minimum width of the gaps is 1.2 to 3.5 of a maximum thickness of the blades and a minimum width of the newly formed gaps is 0.1 to 1.25 of the maximum thickness of the blades.

3. The separator according to claim 1, wherein the blades have a profile of an aircraft wing, wherein a front side of the blades are cut at an angle of about 15 to 45 angular degrees with respect to a tangent of the outer circumference, and tails of the blades are formed as a tapered edge.

4. The separator according to claim 1, wherein the blades are provided at an upper edge with projections, the radially flat rings provided in the gaps with recesses, wherein, when the two segments are assembled, the projections on the blades engage the recesses on the radially flat ring.

5. The separator according to claim 1, wherein a height of the hub is approximately identical to a height of the blades and positioning connectors are formed on the hub of each of the two segments for engagement of the blades of one of the two segments into the gaps between the blades of another of the two segments, when the two segments are being assembled.

6. The separator according to claim 1, wherein each of the two segments comprise a first end segment, a second end segment, and at least one intermediate segment.

7. The separator according to claim 6, wherein the intermediate segment is provided with the blades on both sides of the radially flat ring.

8. The separator according to claim 7, wherein the blades on either side of the radially flat ring of the intermediate section are arranged so as to be offset on one side of the radially flat ring towards the blades on the other side of the radially flat ring by one half of the gap.

9. The separator according to claim 7, wherein the blades on both sides of the radially flat ring of the intermediate section are aligned one above another.

10. The separator according to claim 6, wherein the first end segment and the second end segment are provided with the blades only on one side of the radially flat ring, wherein the first end segment is provided with the blades on a side of the radially flat ring facing away from the turbine wheel and the second end segment is provided with the blades on a side of the radially flat ring facing the turbine wheel.

11. The separator according to claim 6, wherein the first end segment and the second end segment are formed as stand-alone elements, and a bottom and a sealing ring being formed as stand-alone elements.

12. The separator according to claim 6, wherein the first end segment has the radially flat ring provided with an integrated sealing ring, and the second end segment has the radially flat ring provided with an integrated bottom.

13. The separator according to claim 7, wherein the radial supports are shaped so as to cover 50 to 100% of a total height of the hub, while a height of the radial supports decreases towards the radially flat ring.

* * * * *